US007963487B2

(12) United States Patent
Saltenberger et al.

(10) Patent No.: US 7,963,487 B2
(45) Date of Patent: Jun. 21, 2011

(54) PLASTIC CLAMP

(75) Inventors: Reimar Saltenberger, Niederwetz (DE); Marco Malacarne, Chieri (IT); Rainer Ballmann, Hofheim (DE); Markus Kumpf, Allertshausen (DE)

(73) Assignee: Newfrey LLC, Newark, DE (US)

( * ) Notice: Subject to any disclaimer, the term of this patent is extended or adjusted under 35 U.S.C. 154(b) by 776 days.

(21) Appl. No.: 11/934,992

(22) Filed: Nov. 5, 2007

(65) Prior Publication Data

US 2008/0083093 A1    Apr. 10, 2008

(30) Foreign Application Priority Data

Nov. 6, 2006    (DE) .................... 10 2006 052 499

(51) Int. Cl.
  *F16B 2/08*    (2006.01)
(52) U.S. Cl. ............... 248/74.1; 248/68.1; 24/16 PB
(58) Field of Classification Search ............... 24/16 PB, 24/17 B, 17 AP; 248/74.2, 74.3, 74.1
See application file for complete search history.

(56) References Cited

U.S. PATENT DOCUMENTS

| 3,529,795 | A | * | 9/1970 | Van Niel ................ 248/71 |
| 3,637,177 | A | * | 1/1972 | Santucci ................ 248/74.3 |
| 4,061,299 | A |   | 12/1977 | Kurosaki |
| 4,264,047 | A | * | 4/1981 | Nelson ................ 248/73 |
| 4,478,381 | A |   | 10/1984 | Pittion et al. |
| 4,564,163 | A | * | 1/1986 | Barnett ................ 248/71 |
| 4,669,688 | A | * | 6/1987 | Itoh et al. ................ 248/74.2 |
| 4,955,574 | A |   | 9/1990 | Freier |
| 4,958,791 | A |   | 9/1990 | Nakamura |
| 5,083,741 | A | * | 1/1992 | Sancoff ................ 251/9 |
| 5,129,608 | A | * | 7/1992 | Goldman ................ 248/74.3 |
| 5,390,876 | A | * | 2/1995 | Hatano et al. ................ 248/73 |
| 5,494,245 | A | * | 2/1996 | Suzuki et al. ................ 248/74.1 |
| 5,729,872 | A |   | 3/1998 | Ginocchio |
| 6,212,742 | B1 | * | 4/2001 | Baskin ................ 24/457 |
| 6,935,599 | B2 | * | 8/2005 | van Walraven ................ 248/74.1 |

(Continued)

FOREIGN PATENT DOCUMENTS

DE    81 28 711.9    2/1982

(Continued)

OTHER PUBLICATIONS

European Search Report for Application EP 07 119 930.1, dated Apr. 23, 2008, 6 pages (German language).

*Primary Examiner* — Victor Batson
*Assistant Examiner* — Rowland D Do
(74) *Attorney, Agent, or Firm* — Harness, Dickey & Pierce, P.L.C.

(57) ABSTRACT

A synthetic material clamp includes a band bent ring-shaped, having band ends with toothed coupling sections together forming a latching coupling. Each coupling section has a first latching element with a latching tooth directed toward a band inner side and a second latching element with a latching tooth directed toward a band outer side. The latching elements are arranged on the coupling sections so the first latching element of a coupling section engages upon closing of the latching coupling. The first and second latching elements are located on opposite sides of a plane centrally dividing the band in a longitudinal direction. The latching elements of both coupling sections include on a side facing the plane a supporting surface arranged when the latching coupling is closed, with the supporting surfaces of one of the latching elements engaging the supporting surfaces of the latching elements of the other coupling section.

21 Claims, 1 Drawing Sheet

U.S. PATENT DOCUMENTS

| | | | |
|---|---|---|---|
| 7,140,070 B2 * | 11/2006 | Yuta et al. | 16/4 |
| 7,143,480 B2 * | 12/2006 | Igarashi | 24/16 PB |
| 7,340,856 B1 * | 3/2008 | Kalouris | 40/658 |
| 2003/0005554 A1 * | 1/2003 | Nagayasu | 24/17 AP |

FOREIGN PATENT DOCUMENTS

| | | |
|---|---|---|
| DE | 87 03 812.9 | 5/1987 |
| DE | 36 24 383 A1 | 1/1988 |
| DE | 42 00 771 A1 | 7/1993 |
| DE | 69 70 7913 T | 6/2002 |
| EP | 0 069 223 | 1/1983 |
| EP | 0 276 926 | 8/1988 |
| EP | 0 351 524 | 1/1990 |
| WO | WO 03/001069 | 1/2003 |
| WO | WO 2006/094609 | 9/2006 |

* cited by examiner

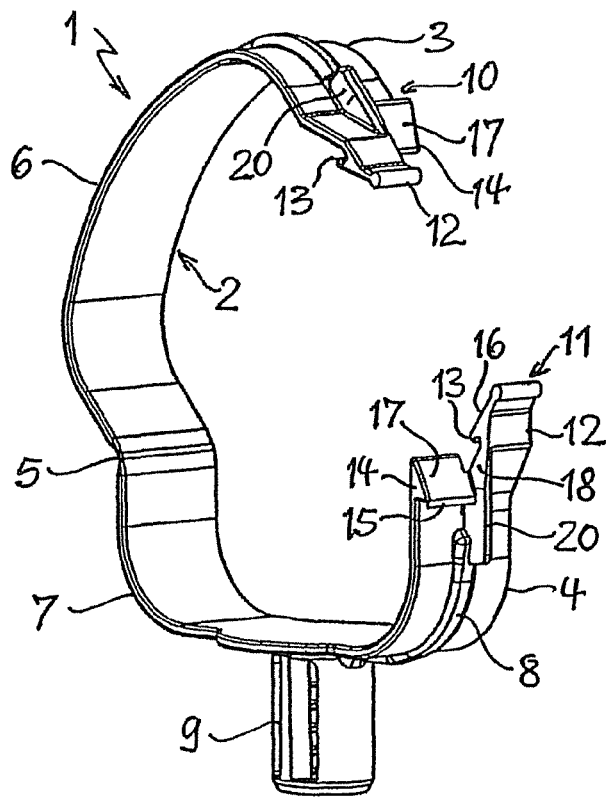
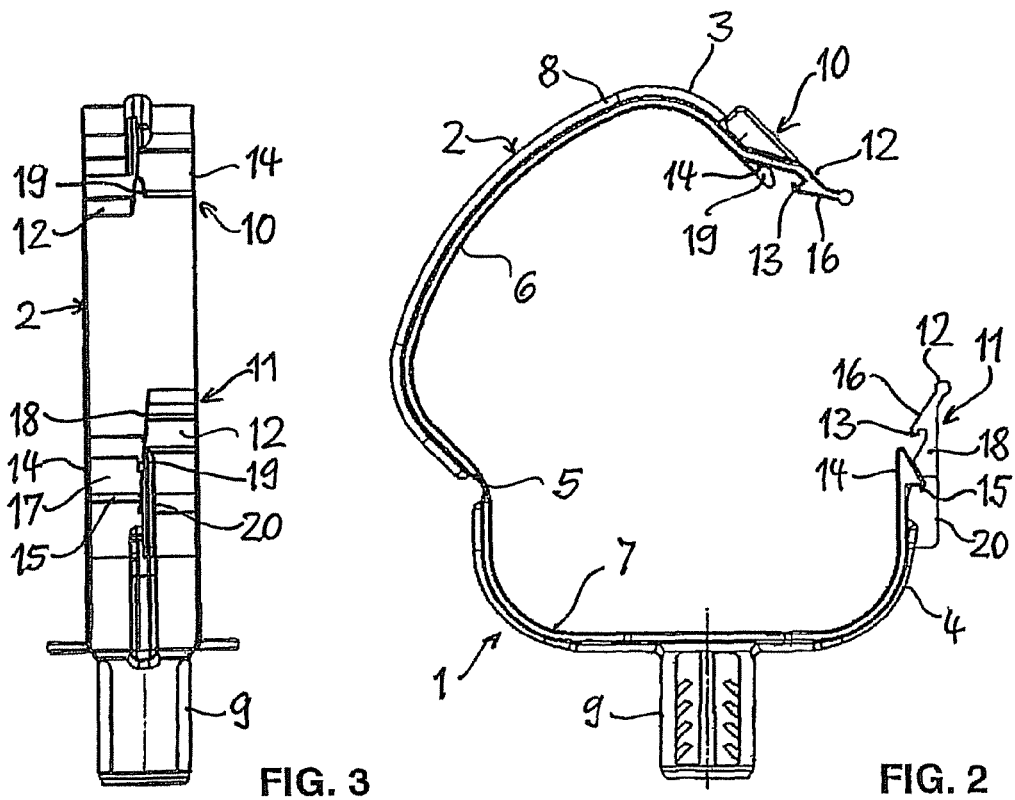
FIG. 1
FIG. 3
FIG. 2

PLASTIC CLAMP

CROSS-REFERENCE TO RELATED APPLICATIONS

This application is a continuation of German Patent Application No. 10 2006 052 499.3, filed Nov. 6, 2006. The disclosure of the above application is incorporated herein by reference.

FIELD

The invention relates to a clamp of synthetic material for enclosing an object with a band bent ring-shaped, the ends of which are capable of being joined together by a closure, where toothed coupling sections together forming a latching coupling are provided at the ends of the band and each coupling section has a first latching element with a latching tooth directed to the inner side of the ring-shaped band and a second latching element with a latching tooth directed to the outer side of the ring-shaped band and where the latching elements are arranged on the coupling sections so that in each instance the first latching element of a coupling section comes into engagement with the second latching element of the other coupling section upon closing of the latching coupling.

BACKGROUND

A clamp of the kind indicated is disclosed in DE 8,128,711 U1. In this known clamp, the latching teeth of the first and second latching elements are in each instance arranged one upon another, so that the latching coupling requires a great deal of space in the radial direction referred to the ring shape of the band. In the lateral direction, the latching elements are not fixed on one another, so that the coupling sections can be shifted against one another laterally to open the clamp. However, this is associated with the disadvantage that the coupling sections may also become shifted laterally against one another and the clamp may open unintentionally.

Further, DE 3,624,383 A1 discloses a clamp in which the coupling section located at one end of the band has a latching element with latching teeth directed outward and is capable of being fitted to the other end of the band through a tunnel channel of the other coupling section running in the longitudinal direction of the band, where the other coupling section has at the outlet of the tunnel channel a latching arm with latching teeth directed inward, which engage in the latching teeth of the first coupling section. In this way, the latching coupling is secured against becoming detached and can be opened by bending the latching arm up. Here, the complicated design of the coupling section forming the tunnel channel, and the relatively great dimensions of this coupling section in the axial, as well as in the radial direction are disadvantageous.

SUMMARY

An object of the invention is to procure a clamp of the kind mentioned at the beginning having a latching coupling which is capable of being closed and opened again in simple fashion, offers great security against unintentional detachment and is characterized by small outer dimensions. In addition, the clamp should be simple and inexpensive to manufacture.

This object is accomplished by a clamp having the features indicated in claim 1. Advantageous refinements of the clamp are indicated in the additional claims.

According to the invention, the first and second latching elements of the coupling sections are arranged on opposite sides of a plane dividing the band, in particular centrally, in the longitudinal direction, and the latching elements of both coupling sections in each instance have, on their side turned toward the plane of division, a supporting surface, which is arranged so that when the latching coupling is closed, the supporting surfaces of the latching elements of one coupling section enter into engagement with the corresponding supporting surfaces of the latching elements of the other coupling section.

The design of the latching coupling according to the invention has the advantage that, owing to the formation of two latching zones lying side by side in relation to the longitudinal direction of the band, the overall height of the latching coupling in the radial direction is very small. In addition, on each coupling section there are two latching devices, which support the coupling sections on one another in all directions and thereby join them firmly together. Under a tensile stress in the longitudinal direction of the band, the latching teeth, hooked together, in the first instance counteract the coupling sections and hold the latching coupling together, while the latching elements, mutually overlapping once from inside and once from outside, provide effective support of the coupling sections in the radial direction. Lastly, the supporting surfaces on the latching elements result in the coupling sections being supported on one another in the lateral direction and thus they cannot come apart.

According to the invention, it may further be provided that the supporting surfaces of the two first latching elements may be formed partially by a rib extending in the longitudinal direction of the band and arranged on the outer side of the coupling sections. Owing to the ribs, the supporting length when the coupling is latched is enlarged and the bending resistance of the latching coupling increased. The supporting surface lengthened by the rib is additionally of advantage when, according to another proposal of the invention, on both coupling sections the first latching element is longer than the second latching element and the latching teeth of the first and second latching elements, viewed in the longitudinal direction of the band, have a distance apart. Then the ribs in each instance form a lateral support for the front end of the first latching element and thereby contribute to the stability of the latching coupling in the transverse direction.

To facilitate interlocking of the two coupling sections, the front ends of the first and second latching elements are provided with ramp surfaces preceding the latching teeth in the direction of fitting. In addition, it may be provided that the supporting surfaces of the first latching elements in each instance have a feed slope, which, with respect to the plane dividing the band in the longitudinal direction, is inclined in such a way that the supporting surface departs from the plane in the direction of the free end of the latching element.

According to the invention, the band may consist of a hard elastic synthetic material and be provided with a longitudinal rib for increasing its inherent stability. To facilitate opening and closing of the band, a film hinge may in addition be provided on the side opposite the latching coupling. For fastening the band to a base, sleeve-like or peg-shaped holding elements may in addition be formed on the outer side of the band.

DRAWINGS

The invention is explained below in detail by an exemplary embodiment, which is represented in the drawing, wherein:

FIG. 1 is a perspective view of a clamp according to the invention in the open state;

FIG. 2 is a view of the outer side of the clamp of FIG. 1 in the region of the open latching coupling; and FIG. 3 is a side view of the clamp of FIG. 1.

DETAILED DESCRIPTION

The clamp 1 shown in the drawing is made in one piece of a thermoplastic synthetic material and has a flat band 2, shaped into an open ring, which in approximately the center between its two ends 3, 4 is divided into two band sections 6, 7 by a film hinge 5. The band sections 6, 7 are reinforced by a longitudinal rib 8 on their outer side. At the band section 7 a sleeve-like fastening element 9 is formed on the outer side at approximately the center, which element is designed for fastening the band 2 to a threaded stud. Instead of the sleeve-like fastening element 9, fastening elements designed in some other way, for example a fastening pin for insertion into a fastening aperture, may alternatively be provided.

In order to be able to close the clamp 1 in simple fashion after insertion of the object to be held, for example a cable harness, coupling sections 10, 11 of the latching coupling are formed at the ends 3, 4 of the band 2. The coupling sections 10, 11 are substantially alike. However, the coupling section 11 is turned 180° in relation to the coupling section 10, so that the left side of the coupling section 10 lies opposite the right side of the coupling section 11. The coupling sections 10, 11 have a first longer latching element 12 with a latching tooth 13 directed to the inner side of the band 2 and a second shorter latching element 14 with a latching tooth 15 directed to the outer side of the band 2. From the latching teeth 13, 15 an inclined ramp surface 16, 17, which when the coupling sections are fitted together passes by the latching teeth 13, 15 assigned to each other so that they can easily go into the latching position, in each instance extends all the way to the front end of the latching elements 12, 14.

The latching elements 12, 14 are in each instance located on the coupling sections 10, 11 on either side of a plane dividing the band 2 centrally in the longitudinal direction. On the side turned toward this plane, each latching element 12, 14 has a supporting surface 18, 19. The supporting surfaces 18 of the latching elements 12 are formed partially by ribs 20, which are situated on the outer side of the coupling sections 10, 11 and extend in the longitudinal direction of the band 2. In addition, in their front region, the supporting surfaces 18 are inclined to the central plane of the band 2 in such a way that their distance from the central plane increases in the direction of the front end of the latching element 12. This facilitates closing of the latching coupling.

For closing the clamp 1, the coupling sections 10, 11 are fitted together. The ramp surface 16 of the latching element 12 of the coupling section 10 thereby comes into engagement with the ramp surface 17 of the latching element 14 of the coupling section 11 and at the same time the ramp surface 16 of the latching element 12 of the coupling section 11 comes into engagement with the ramp surface 17 of the latching element 14 of the coupling section 10. The latching elements 12 are accordingly pressed outward at both coupling sections 10, 11 by the latching elements 14 and elastically deformed far enough that their latching teeth 13 slide over the latching teeth 15 and latch in behind them. In the latched-in position, all four latching teeth are in engagement with one another, their engagement length corresponding to nearly the full width of the band 2. Accordingly, comparatively high holding forces can be transmitted from one band end to the other.

The coupling sections 10, 11 are likewise supported on one another in the lateral direction. In one direction the supporting surfaces 18 lying on one another prevent lateral relative movement of the coupling sections 10, 11. In the other direction, the supporting surfaces 19 lying on one another do this. The latching elements 14 of the coupling sections 10, 11, lying on the inner side, are designed so that they do not project inward over the contour of the adjacent band 2. The closed clamp thereby forms a ring, which has no disturbing projections on its inner side. The free ends of the latching elements 12 lying on the outer side form grip elements, by which they can be gripped by hand or with the aid of a tool and bent outward far enough that the latching teeth come out of engagement and the coupling sections 10, 11 can be separated. The clamp can therefore be opened again. However, opening requires simultaneous bending up of both latching elements, owing to which great security against unintentional detachment is provided.

What is claimed is:

1. A clamp of synthetic material for enclosing an object, comprising:

a flat band having first and second sections rotatably joined by a film hinge;

a free end of the first section defining a first coupling section and a free end of the second section defining a second coupling section, each of the coupling sections together forming a latching coupling and including:

a first latching element with a latching tooth facing an inner side of the band; and a second latching element with a latching tooth facing an outer side of the band, and the first and second latching elements of the first coupling section being oriented 180 degrees with respect to the first and second latching elements of the second coupling section, the first and second coupling sections adapted to releasably engage together when the first and second sections are rotated toward each other about the film hinge;

the first and second latching elements being arranged on the coupling sections so that the first latching element of the first coupling section engages the second latching element of the second coupling section, and the first latching element of the second coupling section engages the second latching element of the first coupling section;

the latching elements of both coupling sections have a supporting surface arranged so that when the latching coupling is closed the supporting surfaces of the latching elements of one of the coupling sections engage with the supporting surfaces of the latching elements of the other coupling section, and each of the first and second coupling sections include a rib extending outwardly forming a lateral support for a front end of the first latching element contributing to a transverse stability of the latching coupling.

2. The clamp of claim 1, wherein the first and second latching elements of the coupling sections are arranged on opposite sides of a plane dividing the band in a longitudinal direction.

3. The clamp of claim 2, wherein the latching elements of both coupling sections have the supporting surface arranged on a side turned toward the plane of division.

4. The clamp of claim 1, wherein the second latching element is shorter than the first latching element for each of the first and second coupling sections.

5. A clamp of synthetic material for enclosing an object, comprising:

a ring-shaped band having ends joined together by a closure;

toothed first and second coupling sections each located at one of the ends of the band together forming a latching coupling, each coupling section having:

a first latching element with a latching tooth directed to an inner side of the band, a second latching element with a latching tooth directed to an outer side of the band;

the first and second latching elements being arranged on the coupling sections so that the first latching element of one of the coupling sections engages the second latching element of the other coupling section when the latching coupling is closed; and the first and second latching elements of the coupling sections are arranged on opposite sides of a plane dividing the band in a longitudinal direction, the latching elements of both coupling sections have, on a side turned toward the plane of division, a supporting surface arranged so that when the latching coupling is closed the supporting surfaces of the latching elements of one of the coupling sections engage with the supporting surfaces of the latching elements of the other coupling section, each of the coupling sections including a rib extending outwardly forming a lateral support for a front end of the first latching element contributing to a transverse stability of the latching coupling.

6. The clamp of claim 5, wherein the plane centrally divides the band.

7. The clamp of claim 6, wherein the supporting surfaces of the first latching elements are partially formed by the rib extending in a longitudinal direction of the band and located on the outer side of the coupling sections.

8. The clamp of claim 5, wherein the first latching element is longer than the second latching element and the latching teeth of the first and second latching elements viewed in the longitudinal direction of the band are spaced apart from each other by a distance.

9. The clamp of claim 5, wherein front ends of the first and second latching elements are each provided with a ramp surface preceding the latching teeth in a direction of engagement.

10. The clamp of claim 5, wherein the supporting surface of the first latching element has a feed slope which with respect to the plane dividing the band in the longitudinal direction is inclined so the supporting surface departs from the plane in a direction of the free end of the latching element.

11. The clamp of claim 5, further including:

a film hinge provided on the side opposite the latching coupling for fastening the band to a base; and sleeve or peg holding elements formed on the outer side of the band.

12. The clamp of claim 5, wherein the band is divided by a film hinge into two band sections, the band sections each being reinforced by a longitudinal rib located on an outer side.

13. A clamping system for enclosing an object and mounting the object to a structure, comprising:

a ring-shaped band having first and second ends joined together by a closure;

a first coupling section located at the first end having:

a first latching element with a latching tooth directed to an inner side of the band, a second latching element with a latching tooth directed to an outer side of the band, the second latching element being shorter than the first latching element;

a second coupling section located at the second end having:

a third latching element with a latching tooth directed to an inner side of the band, a fourth latching element with a latching tooth directed to an outer side of the band, the fourth latching element being shorter than the second latching element;

the latching elements being arranged on the coupling sections so that the first latching element engages the fourth latching element and the third latching element engages the second latching element when the closure is in a closed and latched position; and the first and second latching elements of the first coupling section are arranged on opposite sides of a plane dividing the band in a longitudinal direction, and the third and fourth latching elements of the second coupling section are arranged on opposite sides of the plane dividing the band in the longitudinal direction, each of the coupling sections together forming a latching coupling and including a rib extending outwardly forming a lateral support contributing to a transverse stability of the latching coupling.

14. The clamping system of claim 13, further comprising a film hinge created in the band dividing the band into first and second band sections.

15. The clamping system of claim 14, further comprising a fastening element extending from the second band section for fastening the band to an independent object.

16. The clamping system of claim 13, wherein the latching elements of both coupling sections have, on a side turned toward the plane of division, the first latching element being oriented 180 degrees about the plane from the third latching element, and the second latching element being oriented 180 degrees about the plane from the fourth latching element, so that in the latched-in position.

17. The clamping system of claim 13, wherein all the latching elements are in engaged contact in the latched position having an engagement length of contacting pairs of the latching teeth corresponding to a full width of the band.

18. A method for enclosing an object using a flat band having first and second sections rotatably connected by a film hinge, a free end of the first section defining a first coupling section having a first latching element and second latching element, and a free end of the second section defining a second coupling section having a third latching element and a fourth latching element, the first coupling section and the second coupling section together forming a latching coupling, the method comprising:

aligning the first and second coupling sections such that a rib of each of the coupling sections extends outwardly;

simultaneously engaging a ramp surface of the first latching element with a ramp surface of the fourth latching element and a ramp surface of the third latching element with a ramp surface of the fourth latching element; and pushing the latching elements into contact by elastically deforming the latching elements so that latching teeth of the first and third latching elements slide over latching teeth of the fourth and second latching elements respectively and latch behind them having the ribs extending a supporting length of the latching coupling and forming a lateral support contributing to a transverse stability of the latching coupling.

19. The method of claim 18, further comprising rotating the first and second sections toward each other about the film hinge prior to the aligning step.

20. The method of claim 18, further comprising creating the second and fourth latching elements shorter than the first and third latching elements.

21. The method of claim 18, further comprising creating the flat band from an elastically deformable synthetic material.

* * * * *